July 2, 1957
L. S. LEE ET AL
2,797,783
REVERSIBLE OVERRUNNING CLUTCH
Filed Sept. 21, 1954
2 Sheets-Sheet 1
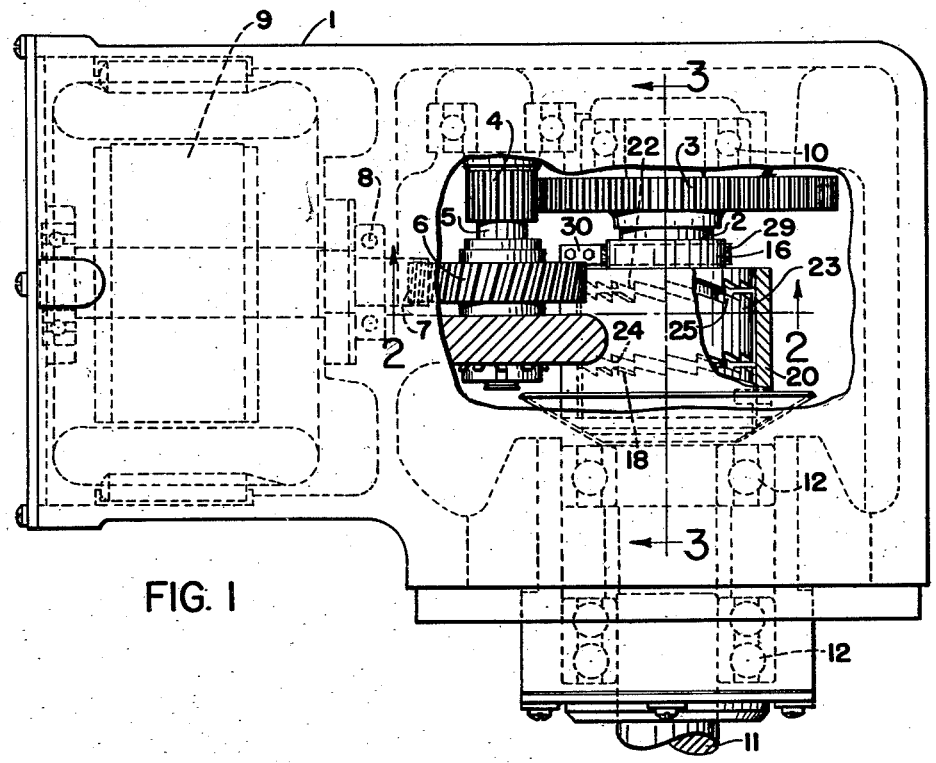
FIG. 1
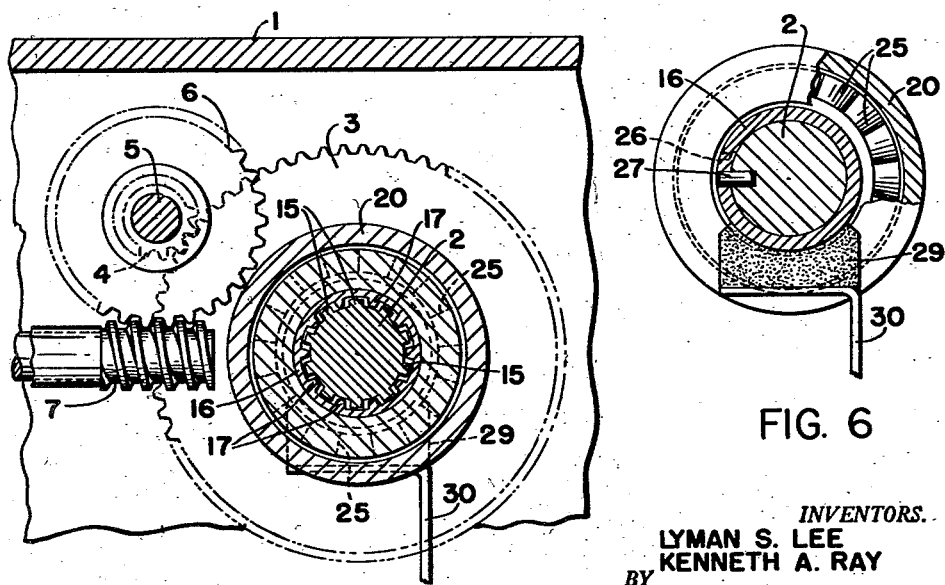
FIG. 2
FIG. 6
INVENTORS.
LYMAN S. LEE
KENNETH A. RAY
BY
ATTORNEY

INVENTORS.
LYMAN S. LEE
KENNETH A. RAY
BY
ATTORNEY

United States Patent Office 2,797,783
Patented July 2, 1957

2,797,783

REVERSIBLE OVERRUNNING CLUTCH

Lyman S. Lee, Shaker Heights, and Kenneth A. Ray, Bedford, Ohio, assignors to Jack & Heintz, Inc., Cleveland, Ohio, a corporation of Delaware Application September 21, 1954, Serial No. 457,358

4 Claims. (Cl. 192—43)

This invention relates in general to power transmission devices and more particularly to improvements in reversible and overrunning clutches.

One of the primary objects of the invention is to provide an improved automatically readily engageable and disengageable clutch assembly which will be capable of being automatically shifted into position between two rotative elements to constitute the power transmission coupling device between a rotative driving element and a rotative driven element, in such a manner that the clutch assembly is automatically reversible when the direction of rotation of the driving element is reversed.

Another object is to provide such a clutch assembly that is automatically overrunning, in that it will be adapted to operate as an overrunning clutch, regardless of the direction of rotation of the driving element and a driven element.

A further object is to provide such a clutch assembly that will include such shifting and retaining means that will insure the disengagement of the clutch assembly as long as the speed of rotation of the driven element exceeds that of the driving element, regardless of the direction of rotation of the driving element.

With the foregoing and other objects in view, the invention resides in the combination of parts and in the details of construction hereinafter set forth in the following specification and appended claims, certain embodiments thereof being illustrated in the accompanying drawings, in which:

Figure 1 is a top plan view of a machine, the housing of which is partially broken away to show a reversible electric motor, a rotary driving input shaft and a gear train between the motor shaft and the driving shaft, a driven output shaft and an improved reversible overrunning clutch assembly having axially opposed toothed faced clutch elements, one carried by each of the driving and driven rotary shafts, the clutch being shown in separated and inoperative position;

Figure 2 is a view in section taken along line 2—2 of Figure 1;

Figure 3:
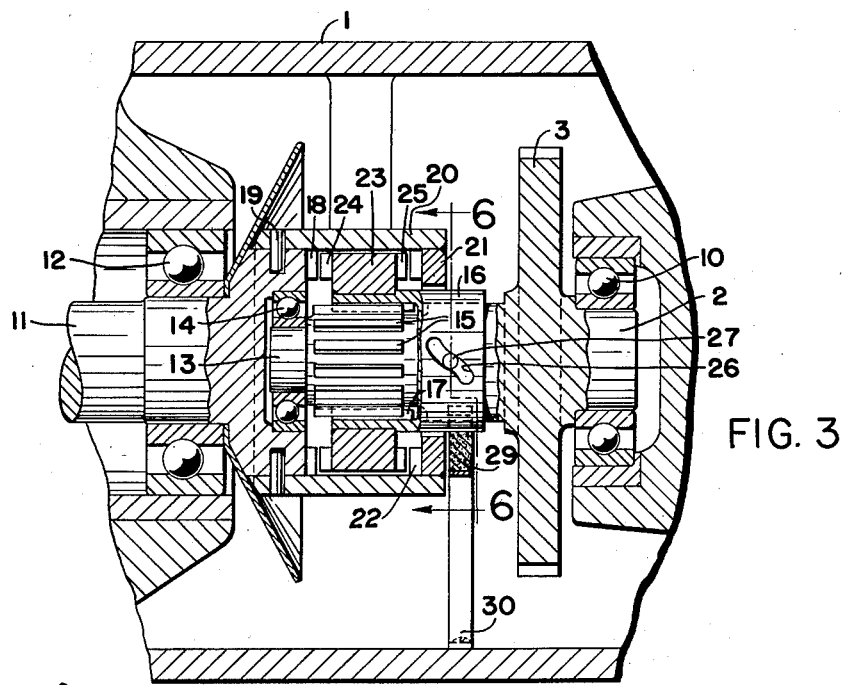
Figure 3 is a view in section taken along line 3—3 of Figure 1, on an enlarged scale.
Figure 4:
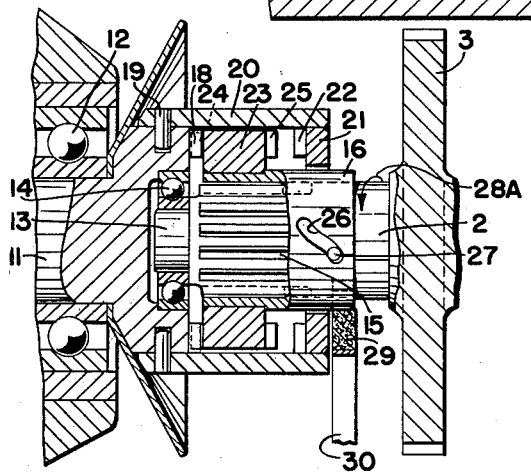
Figure 4 is a view similar to Figure 3, showing the clutch assembly shifted to such a position as to constitute the clutch for connecting the driving input shaft and the driven shaft for rotation in one direction.
Figure 5:
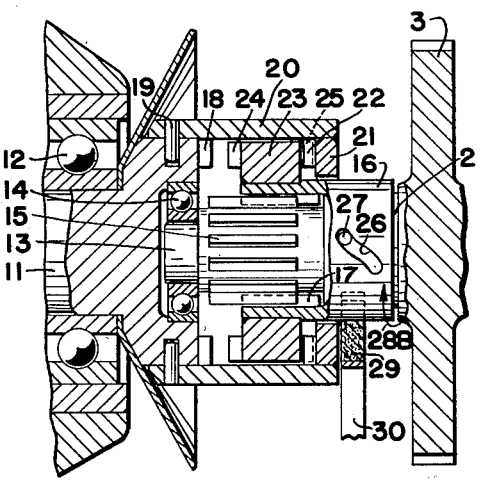

Figure 5 is a view similar to Figures 3 and 4, showing the clutch assembly shifted to a position opposite to that shown in Figure 4 for connecting the driving input shaft and the driven shaft in the opposite direction; and Figure 6 is a view in section taken along line 6—6 of Figure 3, showing in enlarged detail a friction ring embracing a sleeve of the clutch assembly for assisting in insuring engagement of the clutch elements.

Referring more particularly to the drawings, we have shown in Figure 1, for mere purposes of illustration, one environment of our invention, a housing 1, in which is located a rotary shaft 2, which is the driving input shaft, driven through a gear train, including gears 3 and 4, a shaft 5, gear 6 and worm 7 and a motor shaft 8 of a reversible motor 9, as an example of a power source. Shaft 2 is supported by suitable bearings 10. Shaft 11 is supported by a suitable bearing 12 and is the driven output shaft.

In Figure 3, the clutch assembly is shown disengaged so as to remove any coupling engagement between the two shafts 2 and 11. In further explanation, the clutch assembly includes a reduced forward end portion 13, of shaft 2, supported by a bearing 14 in an end face socket in shaft 11. An intermediate portion of shaft 2 is provided with a plurality of axially extending external splines 15. Slidably mounted on shaft 2 is a sleeve 16 that has internal splines 17 that loosely mate, with appreciable rotational clearance, with the external splines 15 of shaft 2.

The right end face of shaft 11 is provided with a series of circularly arranged dog gear teeth 18 of the inclined ratchet ramp type. Also carried by a shaft 11, by such suitable securing means as pins 19, is a cylinder 20 with a flange 21 whose left face is formed with a series of circularly arranged dog gear teeth 22 of the inclined ratchet ramp type. Either rigid with, or integral with sleeve 16, is a collar 23 with teeth 24 on its left face and teeth 25 on its right face. Teeth 24 and 25 are both a series of circularly arranged dog gear teeth of the ratchet ramp type, inclined in opposite directions and are respectively adapted to engage dog gears 18 and 22 in driving engagement, or to be ratcheted thereby back into the neutral unengaged position of Figure 3 under certain shaft speed differentials. Figure 3 clearly shows dog gear 24 disengaged from dog gear 18 and dog gear 25 disengaged from dog gear 22. The clutch assembly assumes this position of Figure 3 at rest and also when the clutch assembly, in its function as an overrunning clutch, ratchets the gears to such neutral position. Another important part of the clutch assembly is the provision of the helical slot, or slots, 26 in sleeve 16 to slidably receive a radially extending pin, or pins, 27 on the shaft 2. Figure 3 shows the clutch assembly in its neutral disengaged position. When power is supplied to rotate the normal input shaft 2 in the direction of the arrow 28A of Figure 4, the rotation of shaft 2 causes its pin 27 to ride in slot 26 of sleeve 16 until it reaches a point just short of bottoming in the right hand extremity of slot 26, as shown in Figure 4. The time consumed in this shift of position of pin 27 in slot 26 is preferably equal to the time consumed in the taking up of the slack, or rotational clearance, between the neutral midway position of splines 15 and 17 of Figure 2 to that of side face abutment, caused by rotation of shaft 2. This shift of position of sleeve 16 axially on shaft 2 brings dog gear 24 on collar 23 into meshing engagement with dog gear 18 on shaft 11. This establishes a drive coupling from shaft 2, as the input shaft, through splines 15 and 17, sleeve 16, collar 23 and dog gears 24 and 18 to shaft 11, as the output shaft. We may use one or more pins 27 and slots 26. They could support the rotational load, if deemed advisable, but we prefer to support this load by the mating splines 15 and 17.

Conversely, when the motor is reversed, the input shaft 2 is driven in the opposite direction, as indicated by the arrow 28B in Figure 5. This rotation of shaft 2 causes pin 27 to ride in slot 26 to a point just short of bottoming in the left hand extremity of slot 26, as shown in Figure 5. This shifting of sleeve 16 to the right on shaft 2 brings collar 23 into such a position as to disengage dog gear 24 from dog gear 18 and engage dog gear 25 of collar 23 with dog gear 22 of shaft 2. This establishes a coupling drive from input shaft 2, splines 15 and 17, sleeve 16, collar 23, dog gears 22 and 25, cylinder 20 and pins 19 to shaft 11 to cause it to rotate in the direction indicated by the arrow 28B in Figure 5.

In order to assist in insuring proper engagement of the dog clutches, or gears, during the shifting movements of sleeve 16 and its internal splines 17 on the external splines 15 of shaft 2 and the shifting movements of pin 27 in slot 26, we prefer to employ a friction ring 29, suspended by a suitable cantilever spring 30, as a braking means against the rotation of shaft 2 in either direction during this linear shifting movement.

Thus it will be seen that we have provided a reversible overrunning clutch as a coupling assembly between two rotatable shafts. With respect to its reversibility, the sleeve 16 is splined to shaft 2. As long as sleeve 16 is in the midway neutral position of Figure 3, there is no engagement of dog 24 with dog 18 and no engagement of dog 25 with dog 22. Hence, rotation of shaft 11 will not be imparted to shaft 2 and, likewise, rotation of shaft 2 will not be imparted to shaft 11. However, as shown in Figure 4, when shaft 2 is rotated in the direction of the arrow 28A, the movement of pin 27 in slot 26 shifts the sleeve 16 and collar 23 to engage dog 24 with dog 18, during which time the rotational slack in the loosely mating splines 15 and 17 is taken up, so as to engage the clutch assembly to couple shaft 2 with drive shaft 11 to drive it in the direction of arrow 28A in Figure 4.

Moreover, when the electric motor is reversed, the input shaft 2 is driven in the opposite direction, as shown at 28B in Figure 5, and the movement of pin 27 in slot 26 shifts the sleeve 16 and collar 23 to engage dog 25 with dog 22, during which time the rotational slack, or clearance, between the loosely mating splines 15 and 17 is taken up, so as to engage the clutch assembly to couple shaft 2 with shaft 11 to drive it in the direction of arrow 28B in Figure 5.

Moreover, regardless of the direction of rotation of input shaft 2 and the output shaft 11 when the clutch is engaged, should the speed of rotation of output shaft 11 at any time exceed that of input shaft 2, the engaged dogs will instantly ratchet to shift sleeve 16 to the neutral position of Figure 3 to disengage dogs 24 and 18 or dogs 25 and 22, as the case may be, so as to disengage the clutch and remove any driving relationship between the two shafts 2 and 11.

We claim:

1. In combination with a rotary driving input shaft and a driven output shaft, a reversible overrunning clutch assembly for automatically effecting a driving clutch connection between said two shafts, said clutch assembly including axially extending external splines on said driving input shaft, a sleeve axially slidably mounted on said driving input shaft and provided with axially extending internal splines, a collar carried by said sleeve and having on each of its opposite axial faces a clutch element having a plurality of oppositely inclined teeth of the inclined ramp ratchet type, the input end of said driven output shaft carrying a clutch element to be engaged by one of the clutch elements of said collar, a member drivingly connected to said driven output shaft and carrying a clutch to be engaged by the other, and opposite, clutch element of said collar, cooperating members carried by said sleeve for axially shifting said sleeve on said driving input shaft along said mating splines to bring one of the clutch elements of said collar into driving engagement with one of the clutch elements of said driven output shaft, so as to drive the latter, regardless of the direction of rotation of said driving input shaft, said engaged clutch elements, upon the driven output shaft attaining a speed of rotation in excess of that of said driving input shaft, being adapted to shift said collar axially into a position where the clutch assembly is disengaged, regardless of the direction of rotation of said driving input shaft.

2. In combination with a rotary driving input shaft and a driven output shaft, a reversible overrunning clutch assembly for automatically effecting a driving clutch connection between said two shafts, said clutch assembly including axially extending external splines on said driving input shaft, a sleeve axially slidably mounted on said driving input shaft and provided with axially extending internal splines so dimensioned as to loosely mate with the external splines of said driving input shaft with appreciable rotational clearance, a collar carried by said sleeve and having on each of its opposite axial faces a clutch element having a plurality of oppositely inclined teeth of the inclined ramp ratchet type, the input end of said driven output shaft carrying a clutch element to be engaged by one of the clutch elements of said collar, a cylinder drivingly connected to said driven output shaft and carrying a clutch to be engaged by the other, and opposite, clutch element of said collar, cooperating members carried by said sleeve for axially shifting said sleeve on said driving input shaft along said mating splines to bring one of the clutch elements of said collar into driving engagement with one of the clutch elements of said driven output shaft, so as to drive the latter, regardless of the direction of rotation of said driving input shaft, said engaged clutch elements, upon the driven output shaft attaining a speed of rotation in excess of that of said driving input shaft, being adapted to shift said collar axially into a position where the clutch assembly is disengaged, regardless of the direction of rotation of said driving input shaft, and a resiliently urged friction braking ring for said driving input shaft for holding said driving input shaft to assist in insuring engagement of said clutches.

3. In combination with a rotary driving input shaft and a driven output shaft, a reversible overrunning clutch assembly for automatically effecting a driving clutch connection between said two shafts, said clutch assembly including axially extending external splines on said driving input shaft, a sleeve axially slidably mounted on said driving input shaft and provided with axially extending internal splines so dimensioned as to loosely mate with the external splines of said driving input shaft with appreciable rotational clearance, a collar carried by said sleeve and having on each of its opposite axial faces a dog clutch element having a plurality of oppositely inclined teeth of the inclined ramp ratchet type, the input end of said driven output shaft carrying a dog clutch element to be engaged by one of the clutch elements of said collar, a cylinder drivingly connected to said driven output shaft and carrying a dog clutch to be engaged by the other, and opposite, dog clutch element of said collar, said sleeve having an axially extending helical slot to be slidably engaged by a radially extending pin on said driving input shaft, said pin on said driving input shaft, in its engagement with the slot in said sleeve, being adapted to axially shift said sleeve on said driving input shaft along said mating splines to bring one of the dog clutch elements of said collar into driving engagement with one of the dog clutch elements of said driven output shaft, so as to drive the latter, regardless of the direction of rotation of said driving input shaft, said engaged dog clutch elements, upon the driven output shaft attaining a speed of rotation in excess of that of said driving input shaft, being adapted, by means of said pin and slot engagement and the dog clutch engagement, to shift said collar axially into a position where the clutch assembly is disengaged, regardless of the direction of rotation of said driving input shaft, the axial length of said slot being so predetermined as to its axial length that the time consumed in the travel of said pin therein from midway neutral position to approximately either end of said slot is approximately equal to that consumed in the shift of said loosely mating splines from neutral midway position to that of end face driving abutment.

4. In combination with a rotary driving input shaft and a driven output shaft, a reversible overrunning clutch assembly for automatically effecting a driving clutch connection between said two shafts, said clutch assembly including an end bearing support for said driving input shaft within said driving output shaft, axially extending external splines on said driving input shaft, a sleeve axially slidably mounted on said driving input shaft and provided with axially extending internal splines so dimensioned as to loosely mate with the external splines of said driving input shaft with appreciable rotational clearance, a collar carried by said sleeve and having on each of its opposite axial faces a dog clutch element having a plurality of oppositely inclined teeth of the inclined ramp ratchet type, the input end of said driven output shaft carrying a dog clutch element to be engaged by one of the clutch elements of said collar, a cylinder drivingly connected to said driven output shaft and carrying a dog clutch to be engaged by the other, and opposite, dog clutch element of said collar, said sleeve having an axially extending helical slot to be slidably engaged by a radially extending pin on said driving input shaft, said pin on said driving input shaft, in its engagement with the slot in said sleeve, being adapted to axially shift said sleeve on said driving input shaft along said mating splines to bring one of the dog clutch elements of said collar into driving engagement with one of the dog clutch elements of said driven output shaft, so as to drive the latter, regardless of the direction of rotation of said driving input shaft, said engaged dog clutch elements, upon the driven output shaft attaining a speed of rotation in excess of that of said driving input shaft, being adapted, by means of said pin and slot engagement and the dog clutch engagement, to shift said collar axially into a position where the clutch assembly is disengaged, regardless of the direction of rotation of said driving input shaft, the axial length of said slot being so predetermined as to its axial length that the time consumed in the travel of said pin therein from midway neutral position to approximately either end of said slot is approximately equal to that consumed in the shift of said loosely mating splines from neutral midway position to that of end face driving abutment, and a resiliently urged friction braking ring for said driving input shaft for holding said driving input shaft to assist in insuring engagement of said dog clutches.

References Cited in the file of this patent

UNITED STATES PATENTS

| | | |
|---|---|---|
| 392,610 | Hoffman | Nov. 13, 1888 |
| 1,234,136 | Connor et al. | July 24, 1917 |
| 1,991,756 | Lazich | Feb. 19, 1935 |
| 2,064,075 | McPherson | Dec. 15, 1936 |

FOREIGN PATENTS

| | | |
|---|---|---|
| 84,675 | France | Sept. 14, 1918 |